United States Patent [19]

Ejiri et al.

[11] 4,385,529
[45] May 31, 1983

[54] FOOT-OPERATED PARKING BRAKE LEVER ASSEMBLY

[75] Inventors: Takeshi Ejiri, Tanashi; Seiichi Tanaka, Higashi-yamato; Teruaki Kasai, Yokohama; Masao Komatsuzaki, Yokohama; Satoru Masuda, Yokohama, all of Japan

[73] Assignees: Nissan Motor Co., Ltd.; Otsuka Koki Co., Ltd., both of Yokohama, Japan

[21] Appl. No.: 189,247

[22] Filed: Sep. 22, 1980

[30] Foreign Application Priority Data

Sep. 20, 1979 [JP] Japan ................ 54-121687

[51] Int. Cl.³ .................. G05G 5/06; G05G 1/14
[52] U.S. Cl. .................. 74/535; 74/539; 74/577 S
[58] Field of Search ............ 74/535, 539, 577 R, 74/577 S, 536, 537, 512, 575

[56] References Cited

U.S. PATENT DOCUMENTS

| | | | |
|---|---|---|---|
| 2,520,759 | 8/1950 | Duma | 74/539 |
| 3,211,269 | 10/1965 | Emig | 74/577 |
| 3,273,418 | 9/1966 | Ellis | 74/539 |
| 3,511,107 | 5/1970 | Yasiro | 74/512 |

Primary Examiner—Kenneth Dorner
Attorney, Agent, or Firm—Thompson, Birch, Gauthier & Samuels

[57] ABSTRACT

A foot-operated parking brake lever assembly wherein a double-manual operation is required to effect release of the parking brake. The assembly is provided with a pawl having a first pawl section and a second pawl section. The first pawl section is pivotally mounted on a brake lever which is in turn pivotally mounted on a stationary support formed with a series of ratchet teeth. The first pawl section is formed with a finger for selectively engaging the ratchet teeth and thereby retaining the brake lever in brake setting positions thereof. The second pawl section is mounted on the first pawl section for limited rotational movement therewith. The second pawl section is urged by pawl biasing means in a direction to cause the finger of the first pawl section to engage the ratchet teeth when the second pawl section is in a rotational position subject to the limiting action by limiting means and in a direction to cause the ratchet teeth of the first pawl section to be disengaged from the ratchet teeth when the second pawl section is in a rotational position free from the limiting action by the limiting means. Brake lever biasing means urges the finger of the first pawl section in a direction to engage the ratchet teeth.

8 Claims, 4 Drawing Figures

FOOT-OPERATED PARKING BRAKE LEVER ASSEMBLY

BACKGROUND OF THE INVENTION

1. Field of the Invention

The present invention relates generally to foot-operated parking brake lever assemblies and more specifically to the provision of novel means for avoiding accidental release of the parking brake setting position.

2. Description of the Prior Art

In FIG. 1, a typical prior art foot-operated parking brake lever assembly for mounting in an automotive vehicle is shown. The parking brake lever assembly is adapted to be positioned adjacent the brake pedal on the side thereof opposite the accelerator pedal.

Referring to FIG. 1, a ratchet plate or support 1 is fixedly attached to a suitable portion of the vehicle body. A series of ratchet teeth 2 is formed in a peripheral portion of the support 1. A brake lever 3 is pivotally mounted on the support 1 by means of a pivot pin 4 and is biased by a spring 5 in the counterclockwise direction in the drawing. A brake setting cable 6 is attached to the upper end of the brake lever 3. A pedal 7 is pivotally mounted on the lower end of the brake lever 3 by means of a pivot pin 8, and is biased by a spring 9 in the clockwise direction in the drawing, i.e., toward the rest position thereof. A pawl 10 is pivotally mounted on the brake lever 3 by means of a pivot pin 12 and is formed with a finger 11 for selectively engaging the ratchet teeth 2. The pawl 10 is urged by a spring 13 in the counterclockwise direction in the drawing, i.e., in the direction to cause the finger 11 to engage the ratchet teeth 2. A release rod 14 interconnects the pawl 10 and the pedal 7.

With the structure described above, the prior art foot-operated parking lever assembly operates as follows.

For applying the parking brake, the driver depresses the lower end portion of the pedal 7, causing the brake lever 3 to pivot about the pivot pin 4 in the clockwise direction in the drawing. The brake setting cable 6 is thus pulled in the brake applying direction, from left to right in the drawing. With increasing depression of the pedal 7, the parking brake is increasingly applied. The pawl finger 11 moves along the ratchet teeth 2 as the brake lever 3 pivots. When the parking brake is fully applied, the driver releases the force applied to the pedal and the pawl finger 11 engages one of the ratchet teeth 2, retaining the brake lever 3 in a selected brake setting position against the action of the spring 5, tending to return the lever to a brake releasing position. The parking brake is thus kept applied.

For releasing the parking brake, the driver depresses the upper edge portion of the pedal, causing it to pivot about the pivot pin 8 in the counterclockwise direction. The release rod 14 is thus pulled in the downward direction, causing the pawl 10 to pivot about the pivot pin 12 in the clockwise direction in the drawing. The pawl finger 11 is disengaged from the ratchet teeth 2, permitting the brake lever 3 to return to the brake releasing position under the bias of the spring 5 and the traction of the brake setting cable 6. Release of the parking brake is thus effected.

With the prior art structure, since easy release of the engagement of the pawl 10 and the ratchet teeth 2 is accomplished by rotating the pedal 7, accidental release of the parking brake, as by inadvertent bumping against the pedal 7 by a small child or even an animal left in the vehicle, may easily result in a serious accident and damage to the vehicle and other property, as well as danger to human life.

SUMMARY OF THE INVENTION

The foot-operated parking lever assembly according to the present invention is provided with a pawl having a first pawl section and a second pawl section. The first pawl section is pivotally mounted on a brake lever which is in turn, pivotally mounted on a stationary support formed with a series of ratchet teeth. The first pawl section has a finger for selectively engaging the ratchet teeth and thereby retaining the brake lever in brake setting positions thereof. The second pawl section is mounted on the first pawl section for limited rotational movement relative thereto and is connected by a connecting member to a pedal pivotally mounted on the brake lever. The second pawl section is urged by pawl biasing means in a direction to pivot the first pawl section to cause the first pawl section finger to engage the ratchet teeth. Brake lever biasing means urges the brake lever toward a brake releasing position thereof and also urges the first pawl section finger in a direction to engage the ratchet teeth. The pawl biasing means is weaker than the brake lever biasing means. However, when the force urging the first pawl section finger into engagement with the ratchet teeth is overcome, the pawl biasing means causes the second pawl section to pivot in the opposite direction, which causes the first pawl section to pivot in the direction to disengage the finger from the ratchet teeth.

With this structure, disengagement of the finger from the ratchet teeth, i.e., release of the parking brake, is accomplished only by simultaneously depressing the brake lever and rotating the pedal away from a predetermined rest position thereof.

It is an object of the present invention to provide a foot-operated parking brake lever assembly including a safeguard against accidental release.

It is another object of the present invention to provide a foot-operated parking brake lever assembly which requires a double-manual operation to release the parking brake.

BRIEF DESCRIPTION OF THE DRAWINGS

These and other objects and advantages of a foot-operated parking lever assembly according to the present invention will become more clearly understood from the following description in conjunction with the accompanying drawings, in which.

DESCRIPTION OF THE PREFERRED EMBODIMENT

Figure 1:
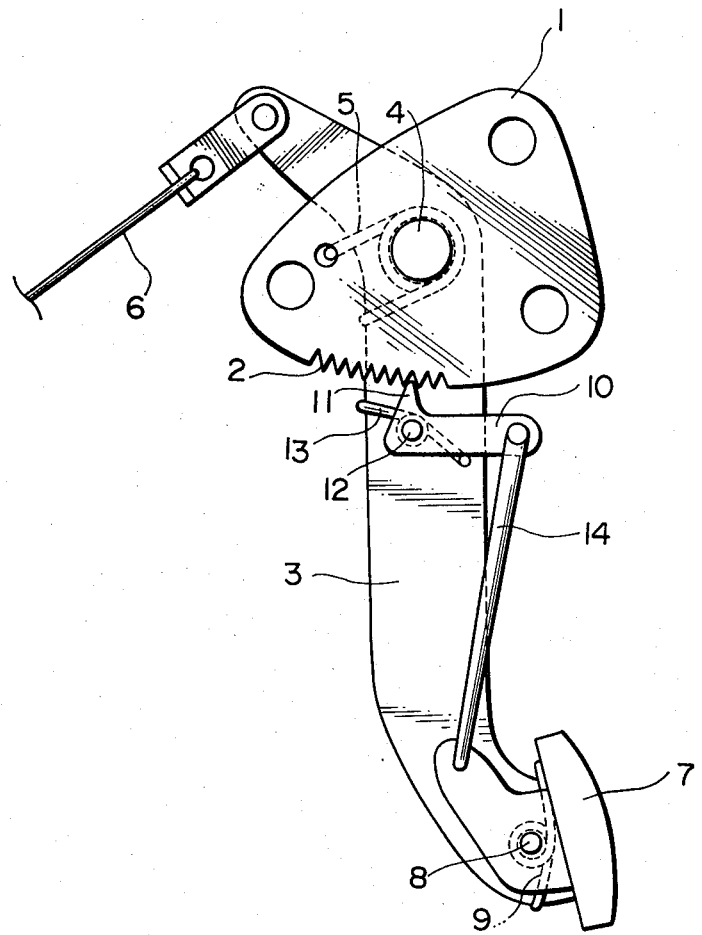
FIG. 1 is a side elevational view of a prior art foot-operated parking brake lever assembly with which the present invention is concerned.
Figure 2:
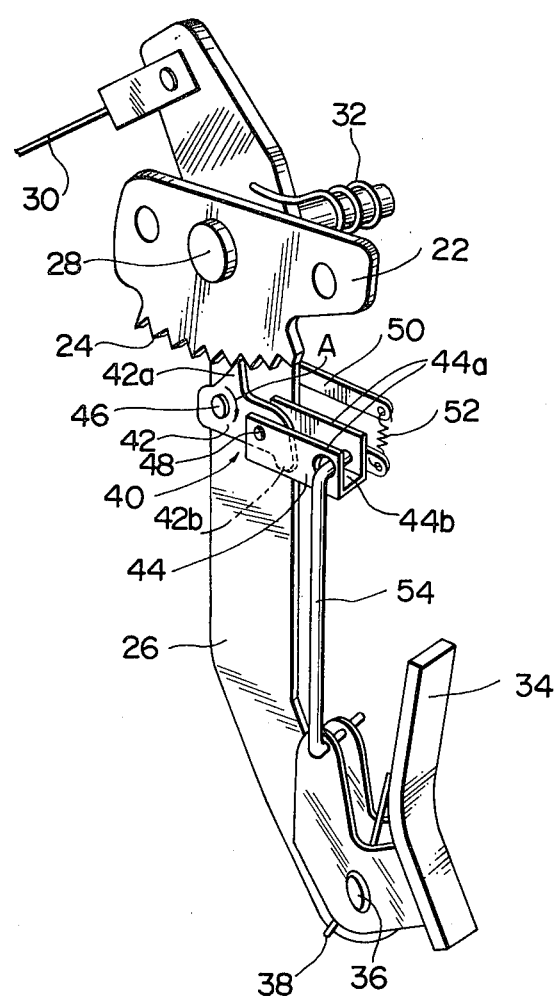
FIG. 2 is a perspective view of a foot-operated parking brake lever assembly according to the present invention.

Referring to FIG. 2, a foot-operated parking brake assembly according to the present invention comprises a stationary support 22 fixedly attached to a suitable portion of the vehicle body. The stationary support 22 has a series of ratchet teeth 24 formed in a lower peripheral portion thereof. On the support 22 a brake lever 26 is pivotally mounted by means of a pivot pin 28. The brake lever 26 has a brake setting cable 30 attached to the upper end thereof. The brake lever 26 is urged by brake lever biasing means, such as a spring 32, in the counterclockwise direction in the drawing, i.e., toward a predetermined brake releasing position thereof. A pedal 34 is pivotally mounted by means of a pivot pin 36 on the brake lever 26 and is biased by a spring 38 toward a predetermined rest position thereof. The above structure substantially follows the conventional arrangement.

In accordance with the present invention, there is provided a pawl 40 which comprises a first pawl section 42 and a second pawl section 44. The first pawl section 42 is pivotally mounted on the brake lever 26 by means of a pivot pin 46 and has a finger 42a for selectively engaging the ratchet teeth 24. The first pawl section 42 is further formed with a seat 42b extending from the end opposite the pivot connection.

The second pawl section 44 is preferably formed into a channel shape having a pair of side walls 44a and a bottom wall 44b. Between the side walls 44a, the first pawl section seat 42b is interposed. By connecting the side walls 44a of the second pawl section 44 by means of a pivot pin 48 to the first pawl section seat 42b, the second pawl section 44 is pivotally mounted on the first pawl section 42. The second pawl section bottom wall 44b and the first pawl section seat 42b engage each other when the first and second pawl sections are substantially aligned, as shown in the drawing. That is, the first pawl section seat 42b and the second pawl section bottom wall 44b define means for limiting the rotational movement of the second pawl section 44 relative to the first pawl section 42.

The second pawl section 44 is connected to pawl biasing means, including a bracket 50 fixedly attached to the brake lever 26 and a tension spring 52 having ends respectively connected to the bracket and the second pawl section at the end thereof opposite the first pawl section 42. The spring 52 is disposed in a tensioned state.

A connecting member 54, such as a rod or cable, interconnects the second pawl section 44 and the pedal 34 in such a manner that the second pawl section may be rotated relative to the first pawl section 42 by rotating the pedal 34 in a direction counterclockwise in the drawing, i.e., in the direction away from the rest position thereof. The connection between the second pawl section 44 and the connecting member 54 is made in a pivotal manner.

Figure 3A:
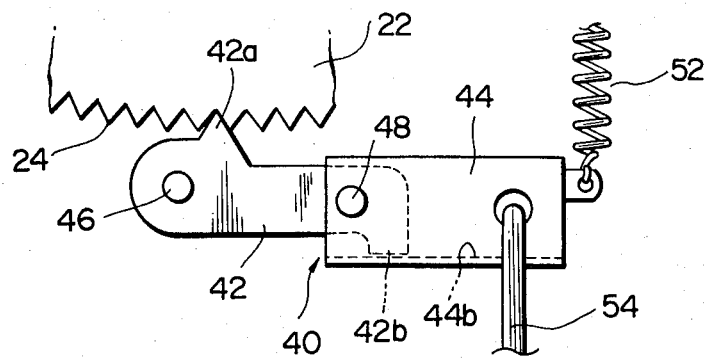
FIGS. 3(A) and 3(B) are enlarged partial side elevational views of the foot-operated parking brake lever assembly of FIG. 3, showing two operating conditions of the pawl employed therein.
Figure 3B:
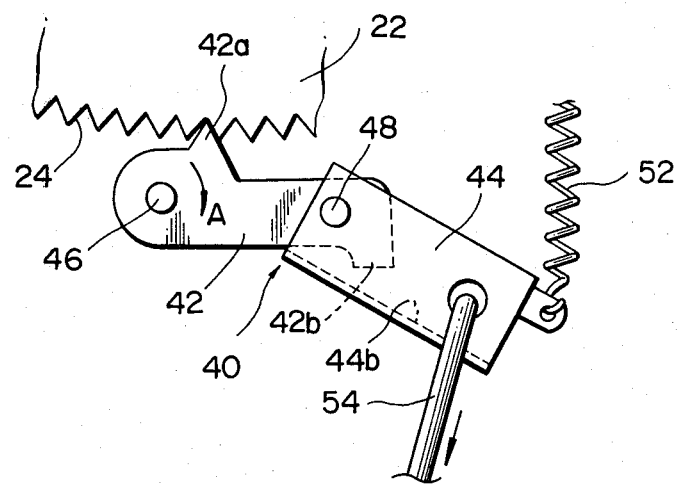

The pawl biasing means spring 52 is weaker than the brake lever biasing means 32. The pawl biasing means spring urges the second pawl section 44 in a direction to cause the first pawl section finger 42a to engage the ratchet teeth 24 when the second pawl section is in a rotational position subject to the limiting action by the limiting means, i.e., when the second pawl section bottom wall 44b engages the first pawl section seat 42b, as shown in FIG. 3(A). Additionally, as shown in FIG. 3(B), when the connecting rod 54 is pulled down, in the direction of the arrow, that downward force and the spring 52 tension force combine to urge the second pawl section 44 in a direction, counterclockwise in the drawing, to pivot the first pawl section 42 clockwise to release the finger 42a from the ratchet teeth 24.

In the foregoing structure, the pivot point of the second pawl section 44 joined to the connecting member 54 is located between the pivot pin 48 and the connecting point of the second pawl section to the pawl biasing means spring 52. Further, the first pawl section seat 42b is arranged to engage the second pawl section 44 at a point thereof between the pivot pin 48 and the connecting member 54.

The foot-operated parking brake lever assembly thus described according to the present invention operates as follows.

For applying the parking brake, the driver depresses the lower end portion of the pedal 34, causing the brake lever 26 to pivot about the pivot pin 28 against the bias of the spring 32, in the clockwise direction in FIG. 2. The parking brake setting cable 30 is thus pulled in the brake applying direction. With increasing depression on the pedal 34, the parking brake is increasingly applied. The first pawl section finger 42a moves along the ratchet teeth 24 by the effect of the action of the spring 52. When the parking brake is fully applied, the driver releases the depression force on the pedal 34. The first pawl section finger 42a is brought into firm engagement with one of the ratchet teeth 24 by the effect of the spring 32, retaining the brake lever 26 in a selected brake setting position thereof. In this instance, the pawl 40 is put into an operative position, as shown in FIG. 3(A). The parking brake is thus kept applied.

For releasing the parking brake, the driver depresses the upper end portion of the pedal 34, causing the pedal to pivot about the pivot pin 36, in the counterclockwise direction in FIG. 2, i.e., away from the rest position thereof. The connecting member 54 is thus pulled in the downward direction, causing the rear end portion of the second pawl section 44 to be pulled downwardly against the bias of the spring 52. The second pawl section 44 alone rotates about the pivot pin 48 in the clockwise direction in FIG. 2. The pawl 40 thus remains in its operating condition, as shown in FIG. 3(B), since the first pawl section finger 42a remains firmly engaged with the ratchet teeth 24 by the effect of the spring 32, tending to rotate the brake lever 26 and first pawl section finger into firm frictional engagement with the ratchet teeth.

In the operating condition of the pawl 40 shown in FIG. 3(B), the spring 52 urges the second pawl section 44 to pivot about the connection with the connecting member 54 in the counterclockwise direction. The second pawl section 44 thus urges the first pawl section 42, through the pivot pin 48, to pivot about the pin 46 in the clockwise direction indicated by the arrow A in FIGS. 2 and 3(B). However, the lever spring 32, being much stronger than the pawl biasing spring 52, retains the first pawl section finger 42a in frictional engagement with the ratchet teeth 24 regardless of the force applied to the connecting rod 54, in that such force only extends the spring 52 as the second pawl section pivots about the pivot pin 48. Those skilled in the art will appreciate that the interface between the pedal 34 and the lever 26 may be so designed to prevent the second pawl section 44 from pivoting further than its point of engagement with the first pawl section 42, i.e., past the position shown in FIG. 3(B).

For the reason set forth above, disengagement of the first pawl section finger 42a from the ratchet teeth 24 cannot be accomplished by rotating the pedal 34 alone relative to the brake lever 26, even by rotating the pedal to its maximum rotatable extent.

Disengagement of the first pawl section finger 42a from the ratchet teeth 24 is, however, accomplished by depressing the pedal 34 to slightly pivot the brake lever 26 about the pivot pin 28 in the direction clockwise in the drawing, i.e., in the direction away from the brake releasing position thereof. By so doing, the frictional force between the first pawl section finger 42a and the ratchet teeth 24 is released, permitting the spring 52 to pivot the second pawl section about the connecting rod 54, which causes the first pawl section to pivot clockwise to disengage the first pawl section finger 42a from the ratchet teeth 24, allowing the brake lever 26 to return to its brake releasing position under the bias of the spring 32. Release of the parking brake is therefore accomplished.

From the foregoing description, it will be understood that the present invention provides an improved foot-operated parking brake lever assembly wherein the parking brake will not be inadvertantly released. Release of the parking brake requires simultaneously depressing the brake lever and rotating the pedal away from the rest position thereof. Thus, a two-phase or double-manual operation is required to effect release of the parking brake.

Obviously, many variations and modifications of the present invention are possible in light of the above teachings. It is, therefore, to be understood that within the scope of the appended claims, the invention may be practiced otherwise than as specifically described.

What is claimed is:

1. A foot-operated parking brake lever assembly comprising:
    a stationary support;
    a brake lever pivotally mounted on said support and having a brake setting cable attached thereto;
    brake lever biasing means connected to said brake lever for urging said brake lever toward a brake releasing position thereof;
    a series of ratchet teeth formed in a peripheral portion of said support;
    a pawl for selectively retaining said brake lever in brake setting positions thereof against repivoting to the brake releasing position, said pawl having a first pawl section and a second pawl section, said first pawl section being pivotally mounted on said brake lever and having a finger for selectively engaging said ratchet teeth, said second pawl section being pivotally mounted on said first pawl section, said pawl further having means for limiting the rotational movement of said second pawl section relative to said first pawl section;
    a pedal pivotally mounted on said brake lever and biased toward a predetermined rest position thereof;
    a connecting member interconnecting said second pawl section and said pedal in such a manner that said second pawl section is rotated relative to said first pawl section by rotating said pedal away from said rest position; and
    pawl biasing means connected to said second pawl section for urging said second pawl section in a direction to cause said finger of said first pawl section to engage said ratchet teeth when said second pawl section is in a rotational position subjected to the limiting action by said limiting means and for urging said second pawl section in a direction to cause said finger of said first pawl section to be disengaged from said ratchet teeth when said second pawl section is in a rotational position free from the limiting action by said limiting means, whereby said finger of said first pawl section is disengaged from said ratchet teeth only by simultaneously depressing said brake lever and rotating said pedal away from said rest position.

2. A foot-operated parking brake lever assembly as claimed in claim 1, wherein said first pawl section further comprises a seat extending therefrom and said second pawl section is in the form of a channel having a pair of side walls and a bottom wall, said bottom wall of said second pawl section being abuttingly engageable with said seat of said first pawl section, and wherein said limiting means comprises said seat of said first pawl section and said bottom wall of said second pawl section.

3. A foot-operated parking brake lever assembly as claimed in claim 2, wherein said first pawl section has an end portion formed with said seat, said end portion of said first pawl section being interposed between said side walls of said second pawl section, and wherein said pivotal connection between said first and second pawl sections is made by pivotally connecting said side walls of said second pawl section to said end portion of said first pawl section.

4. A foot-operated parking brake lever assembly as claimed in claim 1, wherein said pawl biasing means comprises a bracket fixedly attached to said brake lever and a tension spring having ends connected to said bracket and said second pawl section.

5. A foot-operated parking brake lever assembly as claimed in claim 1, wherein the point of interconnection at which said second pawl section is joined to said connecting member is located between the point of pivotal mounting at which said second pawl section is joined to said first pawl section and the point of connection at which said second pawl section is joined to said pawl biasing means.

6. A foot-operated parking brake lever assembly as claimed in claim 2, wherein said seat of said first pawl section is engageable with said second pawl section at a point thereof between the point of pivotal mounting at which said second pawl section is joined to said first pawl section and the point of interconnection at which said second pawl section is joined to said connecting member.

7. A foot-operated parking brake lever assembly as claimed in claim 1, wherein said pawl biasing means is weaker than said brake lever biasing means.

8. A foot-operated parking brake lever assembly as claimed in claim 1, wherein the connection between said second pawl section and said connecting member is made in a pivotal manner.

* * * * *